United States Patent
Schwarte et al.

(10) Patent No.: US 10,703,015 B2
(45) Date of Patent: Jul. 7, 2020

(54) CUTTING BEAD FOR A SAW ROPE

(71) Applicant: Universitaet Kassel, Kassel (DE)

(72) Inventors: Stefan Schwarte, Warburg (DE); Christoph Heise, Wolfhagen (DE); Stefan Boehm, Schwuelper (DE)

(73) Assignee: UNIVERSITAET KASSEL, Kassell (DE)

( * ) Notice: Subject to any disclaimer, the term of this patent is extended or adjusted under 35 U.S.C. 154(b) by 139 days.

(21) Appl. No.: 15/837,448

(22) Filed: Dec. 11, 2017

(65) Prior Publication Data
US 2018/0099433 A1    Apr. 12, 2018

Related U.S. Application Data

(63) Continuation of application No. PCT/EP2016/062543, filed on Jun. 2, 2016.

(30) Foreign Application Priority Data

Jun. 12, 2015 (DE) .................. 10 2015 109 432

(51) Int. Cl.
B28D 1/12 (2006.01)
B23D 61/18 (2006.01)
B23D 65/00 (2006.01)

(52) U.S. Cl.
CPC ........... *B28D 1/124* (2013.01); *B23D 61/185* (2013.01); *B23D 65/00* (2013.01)

(58) Field of Classification Search
CPC ............................. B23D 61/185; B23D 65/00
See application file for complete search history.

(56) References Cited

U.S. PATENT DOCUMENTS

| 2,696,228 A | 12/1954 | Bowen |
| 3,847,569 A | 11/1974 | Snow |
| 3,884,212 A * | 5/1975 | Armstrong ........... B23D 61/185 |
| | | 125/21 |

FOREIGN PATENT DOCUMENTS

| AT | 003 424 U1 | 3/2000 |
| CN | 102 555 073 B | 4/2015 |
| DE | 2 014 137 A | 10/1971 |
| DE | 40 38 480 A1 | 6/1992 |
| DE | 43 06 273 A1 | 9/1994 |
| DE | 197 52 223 A1 | 10/1998 |

(Continued)

OTHER PUBLICATIONS

PCT International Preliminary Report on Patentability in co-pending, related PCT Application PCT/EP2016/062543, dated Dec. 12, 2017.

*Primary Examiner* — Dung Van Nguyen
(74) *Attorney, Agent, or Firm* — Thomas | Horstemeyer, LLP

(57) ABSTRACT

A cutting bead (13) for a saw rope (15) comprises a geometrically defined cutting portion (2) and tapers from the geometrically defined cutting portion (2) contrary to a sawing direction. With such cutting beads (13), a saw rope (15) is formed. In a method for manufacturing a saw rope (15), a cutting element (1) with a geometrically defined cutting portion (2) and an abrasive element (6) with a geometrically undefined cutting portion (14) or a neutral element (8) are joined. With the cutting element (1) and the abrasive element (6) or the neutral element (8), a cutting bead (13) is formed. The cutting bead (13) is joined onto the support rope (16).

22 Claims, 10 Drawing Sheets

(56) References Cited

FOREIGN PATENT DOCUMENTS

| | | |
|---|---|---|
| DE | 10 2010 021 959 A1 | 12/2011 |
| EP | 0 317 965 A1 | 11/1988 |
| EP | 0 486 238 A1 | 11/1991 |
| EP | 0 489 356 A1 | 11/1991 |
| EP | 1 323 498 A | 12/2002 |
| EP | 2 390 035 A1 | 5/2011 |
| FR | 437 117 A | 4/1912 |
| FR | 2 328 553 A | 5/1977 |
| WO | 2002/04160 A1 | 1/2002 |
| WO | 2014/013450 A1 | 1/2014 |

\* cited by examiner

CUTTING BEAD FOR A SAW ROPE

CROSS REFERENCE TO RELATED APPLICATIONS

This application is a continuation of International Application PCT/EP2016/062543 with an International Filing Date of Jun. 2, 2016 and claiming priority to co-pending German Patent Application No. DE 10 2015 109 432.0 entitled "Schneidperle für ein Sägeseil, Sägeseil and Verfahren zur Herstellung eines Sägeseils", filed on Jun. 12, 2015.

FIELD OF THE INVENTION

The invention relates to a cutting bead for a saw rope or saw wire (in the following referred to collectively as a "saw rope"), a saw rope formed with such a cutting bead and a method for manufacturing a saw rope.

Saw ropes are employed in rope saws. Such rope saws, for example, are employed for sawing stone, concrete, steel, concrete reinforced by steel or artificial stone (brickwork). The saw rope typically is operated as a continuous rope, where the continuous rope is driven with a cutting speed in such a way that it is held under tension and pulled along or through a sawing channel of a workpiece.

Saw ropes have lengths in the region of several meters up to more than a hundred meters. A saw rope comprises a support rope on which cutting beads are mounted, usually in regular distances. The cutting beads, but not the support rope, engage the workpiece and have a sawing effect.

BACKGROUND OF THE INVENTION

DE 2 014 437 A discloses a saw rope for a rope saw in which single bodies with diamond grit sintered into them are fixed onto a wire rope. The bodies each have an outer surface roughly in the shape of a half cone and each are applied onto one of two strands of the wire rope. The two strands are twisted around each other and the bodies arranged in a staggered way in the circumferential direction.

A conventional shape for cutting elements of a saw rope is that of a hollow cylinder which has been threaded onto a wire rope. As disclosed, for example, in FR 2 328 553 A and WO 2014/013450 A1, in the region of an outer surface the cutting beads comprise diamond dust or diamond splinters, in which way a so-called "geometrically undefined cutting portion" is formed on the cutting bead.

WO 02/04160 A1 discloses a saw rope for a rope saw with a rope and several cutting beads. The cutting beads have a cutting portion with diamonds and a support/cutting portion. The support/cutting portion is comprised of the same material as a support portion of the cutting bead, especially steel. The support/cutting portion may also be made of a harder material, especially sintered tungsten carbide or sintered ceramic material. The cutting portion with diamonds and the support/cutting portion cooperate when cutting a stone material. The diameter of the cutting portion equals the diameter of the support/cutting portion or is larger than this. According to the figures of WO 02/04160 A1, the cutting portion has a substantially cylindrical shape.

A similar support portion that is flush with the surface of a cutting portion is disclosed in U.S. Pat. No. 3,847,569 B. The support portion is cylindrical in the region of the surface facing the material which is to be cut. The support portion is a portion of a main body of the cutting bead made of metal, onto which the cutting portion has been applied.

DE 10 2010 021 959 A1 (corresponding to EP 2 390 035 A1) discloses a saw rope with cutting beads, especially for sawing soft workpieces of insulating matter, soft fibre matter or polystyrene foam. The single cutting beads comprise a so-called "geometrically defined cutting portion", where the entire cutting beads including the geometrically defined cutting portion are made of steel and comprise a hardened surface. The geometrically defined cutting portion tapers contrary to the direction of movement of the saw rope according to the designated use with a wedge angle, which for example may be 20°.

U.S. Pat. No. 2,696,228 A discloses a cutting bead for a saw rope for cutting wood, where the cutting bead is made of steel or a special alloy. The cutting bead comprises a geometrically defined cutting portion and tapers contrary to a direction of movement of the cutting bead according to designated use, where a clearance angle of 5-10° is preferred.

DE 43 06 273 A1 discloses a saw wire which comprises thickenings due to longitudinal compressions, which form cutting edges that can be hardened, tempered or ground.

Cutting beads for saw ropes with geometrically undefined cutting portions are known from EP 0 317 965 B1, AT 003 424 U1 and DE 40 38 480 A1 (corresponding to EP 0 489 356 A1).

SUMMARY OF THE INVENTION

It is an object of the invention to provide a cutting bead which can be employed in an especially advantageous way in a saw rope and a rope saw while having an abrasion on the cutting bead itself that is as low as possible and/or reaching an area cut per time unit that is as high as possible. Furthermore, a saw rope with such a cutting bead is to be provided as well as a method with which such a saw rope can be manufactured.

The invention relates to a cutting bead for a saw rope. The cutting bead has a geometrically defined cutting portion. Furthermore, the cutting bead also comprises a geometrically undefined cutting portion and/or a second geometrically defined cutting portion.

A geometrically undefined cutting portion is a cutting portion in which a number of partial cutting portions, a shape of a cutting edge and a position in relation to a workpiece can only be described by means of statistical parameters. Typical geometrically undefined cutting portions, for example, are formed by applying diamond dust onto a carrier material. The diamond dust consists of diamond dust grains, each of which partially entering into the carrier material. That part of each diamond dust grain protruding from the carrier material is part of the actively cutting surface. The entirety of the diamond dust grains forms the actively cutting surface which in its geometry has not been predefined but has been randomly formed. A geometrically defined cutting portion, on the contrary, is a cutting portion in which the number of partial cutting portions, the shape of the cutting edge and its position in relation to the workpiece are known and describable. An example is the cutting portion of a knife.

As a geometrically defined cutting portion, such a cutting portion shall also be understood in which a wedge angle is less than 90°, especially less than 88°, 85° or 80°. The wedge angle is the angle which is formed on a cutting edge of a cutting portion. The wedge angle is formed between a clearance surface and a cutting surface (also referred to as a rake face), where a front face pointing in a sawing direction forms the cutting surface and a surface inclined with a clearance angle with respect to the sawing channel, in the case of the cutting bead an outer surface of the cutting bead, forms the clearance surface.

When using the cutting bead for sawing, the cutting bead is moved with an infeed movement component and a sawing movement component. The infeed movement component has a direction perpendicular to a longitudinal extension of the saw rope and leads to an increase of the depth of the sawing channel. The sawing movement component is collinear with the longitudinal extension of the saw rope and also referred to as the sawing direction.

For one embodiment of the invention, the geometrically defined cutting portion or the first geometrically defined cutting portion tapers contrary to the sawing direction.

For one embodiment of the invention, a cutting bead may at least partially have the shape of a truncated cone, where in this case the base area of the truncated cone is arranged in front, the top area of the truncated cone is arranged in the back when viewed in the sawing direction. The more complex embodiments of the cutting bead described in the following, too, may be based on such a truncated cone shape. For example, the cutting bead may have the shape of a truncated cone oriented as described with a cylinder or a second truncated cone joined to the base area or the top area. Other geometries of the cutting bead can also be imagined as long as they comprise a taper. In a longitudinal section, the cutting bead for example can comprise a tapering contour that is step-like, forms ledges, comprises straight segments inclined with respect to one another, is curve-shaped and/or is wave-like. The cutting bead may taper continuously. It may also comprise segments which in their course enlarge and taper again. As a taper in the sense of the invention, especially any contour is understood in which a diameter of the cutting bead measured further back in the sawing direction is smaller than a diameter measured more to the front in the sawing direction. It is irrelevant whether other diameters of the cutting bead are larger or smaller than one of the mentioned diameters. It is also possible for a taper of the cutting bead not to be realized to be continuous in the circumferential direction but to extend only in at least a segment of the circumference of the cutting bead.

The cutting bead may be realized as one piece. Preferably, however, the cutting bead has two elements realized separately. In the following, just in order to simplify the description of the invention, it is assumed that the cutting bead comprises two elements of which one is referred to as the cutting element and comprises the geometrically defined cutting portion or the first geometrically defined cutting portion, without the intention of limiting the invention to the separate realization of the two elements. With the assumption mentioned, the taper may for example extend only over the cutting element while the other element (or further elements) does (do) not comprise a taper.

A length of the cutting bead may be between 4 and 16 mm. If the cutting bead only comprises one cutting element, the length of the cutting bead may be between 6 and 9 mm, especially between 7 and 8 mm.

In one embodiment, the cutting bead can be employed for sawing in an advantageous way with respect to known cutting beads. If geometrically defined cutting portions are present, a better control over the cutting process than in a sawing only with geometrically undefined cutting portions is guaranteed, for example because the geometrically defined cutting portion guarantees an exact guidance during sawing and/or a geometrically defined sawing or cutting channel is formed. In this way, possibly less heat is generated due to less friction. Due to this, possibly the accumulated cut area of the saw rope can be increased with respect to the accumulated cut area of a saw rope according to prior art. The accumulated cut area is the area which can be sawed with the saw rope before the saw rope has to be processed, that is, before e.g. cutting beads have to be replaced or cutting portions have to be whetted. The saw rope therefore might save material costs when compared to the saw ropes according to prior art—since a new saw rope has to be bought less often—as well as costs caused by a standstill of the rope saw and by the replacement of the saw rope itself. The cutting bead possibly also reduces environmental burdens occurring when sawing with the rope saw: Geometrically undefined cutting portions produce fine waste particles (dust) during sawing. Geometrically defined cutting portions, on the contrary, produce distinctly larger waste particles (chips) during sawing. Contrary to chips, dust has to be extracted by suction or be bonded with large amounts of water because it, for example, has harmful effects if it ends up in the respiratory tracts of humans or animals. A consequently high use of electricity and/or water therefore possibly may not occur for the cutting bead according to the invention. Additionally, work processes can be simplified. With geometrically undefined cutting portions, higher losses of a treated material possibly occur than with geometrically defined cutting portions. Since with geometrically defined cutting portions the cutting process can be carried out in a more controlled way, in some cases a security of the process may also be increased, especially if the cutting bead encounters present inhomogeneities or inclusions in the workpiece.

Due to the tapering of the cutting bead, a free space is created between the cutting element and the workpiece. A contact surface between the cutting element and a surface to be worked on the workpiece is decreased in size in this way. In this way, friction between the cutting element and the surface to be worked on can be decreased as well. Due to friction, heat loss occurs, so that at a higher friction a higher amount of energy is necessary for obtaining the same cutting effect. Cutting beads with geometrically undefined cutting portions according to prior art create high friction since they engage the workpiece with a large surface. The cutting bead possibly reduces the amount of energy necessary for cutting. It is also possible that in the free space chips created in sawing are accommodated and/or led away.

It is possible that a cutting bead comprises a clearance angle of 0°. In this case, the free space created between the cutting element (the clearance surface of the cutting element) and the sawing channel in the workpiece is arranged with a backwards distance from the cutting edge with respect to the sawing direction. The geometrically defined cutting portion or the first geometrically defined cutting portion then rests against the sawing channel in the workpiece with a segment behind the cutting edge (forming the clearance angle of 0°) before the cutting bead tapers. The free space therefore does not directly follow to the cutting edge. In one embodiment, the geometrically defined cutting portion or the first geometrically defined cutting portion comprises a clearance angle larger than 0°. If the clearance angle is chosen to be larger than 0°, the free space directly follows to the cutting edge. In one embodiment, the clearance angle is more than 0°, but less than 20°, for example between 5° and 15° or between 9° and 11°.

In one embodiment, the geometrically defined cutting portion or the first geometrically defined cutting portion comprises a cutting edge architecture. As the cutting edge architecture, for example curves (radii) and/or bevels may be chosen on the cutting edge, via which a transition from the cutting surface to the cutting edge and/or from the cutting edge to the clearance surface can be provided. As a cutting edge architecture, it is understood here that the cutting edge differs from an angle formed by two intersecting planes (the clearance surface and the cutting surface), but has been processed in such a way, for example rounded or bevelled, that advantageous effects are obtained. For example, by means of the cutting edge architecture a stability of the cutting edge can be increased.

In one embodiment, the geometrically defined cutting portion or the first geometrically defined cutting portion is formed with a superhard cutting material. Such cutting materials are referred to as superhard cutting materials which are harder than hard metals, cermets (composite materials of ceramic materials in a metallic matrix) and cutting ceramics. Within the framework of the invention, as superhard cutting materials especially all cutting materials shall be understood which have a hardness more than 2600 HV 30. Presently, especially diamond and cubic boron nitride (CBN) are understood to be superhard cutting materials. It is possible, however, that the group of superhard cutting materials in the future will be extended by further superhard cutting materials which can also be employed within the framework of the invention. The geometrically defined cutting portion or the first geometrically defined cutting portion may, however, be realized with another suitable cutting material. For example, the geometrically defined cutting portion or the first geometrically defined cutting portion may be formed with hard metal.

It is possible that a thin layer of the cutting material is applied onto a carrier material. The thin layer of the cutting material may be about a third as thick as a thick layer of the cutting material, especially the thin layer may comprise cutting material with a thickness of 0.25 to 0.75 mm and the thick layer may comprise carrier material with a thickness of 1.25 to 1.75 mm. A material thickness of the geometrically defined cutting portion or the first geometrically defined cutting portion may be 1 to 5 mm, especially 1 to 3 mm or 1.5 to 2.5 mm.

In one embodiment, the geometrically defined cutting portion or the first geometrically defined cutting portion is formed with diamond. Realization with polycrystalline diamond (PCD) is especially preferred. The geometrically defined cutting portion or the first geometrically defined cutting portion, however, may also be formed with monocrystalline diamond (MCD). The diamond may have been applied onto a suitable base, a carrier material or a carrier body. For example, the diamond may have been sintered onto a hard metal base. An overall thickness of the hard metal base and the diamond of 1 to 5 mm may result, especially 1.5 to 2.5 mm. The layer thickness of the diamond may be smaller than the layer thickness of the hard metal base, especially less than half as thick or a third as thick. For example, the layer thickness of the diamond is 0.5 mm+/−0.1 mm and the layer thickness of the hard metal base is 1.5 mm+/−0.2 mm.

Cutting beads according to prior art with a geometrically undefined cutting portion consist of cutting material for their entire volume. Due to this, cutting beads according to prior art are comparatively expensive since they have a high use of expensive cutting materials, for example comprising diamond. The geometrically defined cutting portion, however, for one embodiment only comprises a thin layer of cutting material. In this way, a consumption or use of cutting material of the cutting bead is possibly smaller than that of a cutting bead according to prior art.

In one embodiment, the cutting bead (in addition to the geometrically defined cutting portion) comprises a geometrically undefined cutting portion. The geometrically undefined cutting portion may correspond to the geometrically undefined cutting portion of cutting beads known from prior art and be formed in a corresponding way. The cutting bead may be realized as one piece and therefore form the geometrically defined and the geometrically undefined cutting portion on one element. Preferably (in addition to and separately from the cutting element explained before), an abrasive element is formed which comprises the geometrically undefined cutting portion. Therefore, the cutting bead may be realized in two parts (or multiple parts).

The abrasive element or a part of the cutting bead equipped with the geometrically undefined cutting portion may have a length of 3 to 8 mm, for example between 5 and 6 mm. The saving of cutting material may also be obtained if the cutting bead comprises a geometrically undefined cutting portion since the abrasive element or the part of the cutting bead equipped with the geometrically undefined cutting portion may be reduced in its length with regard to prior art.

In one embodiment, the geometrically undefined cutting portion is realized with diamond. The geometrically undefined cutting portion may be realized with PCD or MCD. If a cutting element and an abrasive element are present, they may be realized with the same material. For example, the geometrically defined cutting portion or the first geometrically defined cutting portion as well as the geometrically undefined cutting portion may be realized with PCD. However, it is possible that the geometrically defined cutting portion or the first geometrically defined cutting portion and the geometrically undefined cutting portion are realized with different materials. For example, the cutting element may be formed with PCD, the abrasive element, on the contrary, with MCD. It is also possible that, for example, the cutting element is formed with CBN, the abrasive element, on the contrary, with PCD. If several geometrically undefined cutting portions are present on the cutting bead, for example several abrasive elements are formed, the geometrically undefined cutting portions may be realized with different materials.

In one embodiment, the cutting bead comprises a base element and/or neutral element on which the geometrically defined cutting portion or the first geometrically defined cutting portion and/or the or a geometrically undefined cutting portion are held or formed, which defines a distance between a geometrically defined cutting portion and a geometrically undefined cutting portion or two geometrically defined cutting portions and/or which is not part of a removal of material. The base element and/or neutral element therefore may for example be a base element on which the geometrically defined cutting portion or the first geometrically defined cutting portion is held. The cutting element may be held on the base element. On the base element, additionally or alternatively the or a geometrically undefined cutting portion may be held, for example in that the abrasive element is held on the base element. On the base element itself, however, the or a geometrically undefined cutting portion may also be realized, for example in that diamond dust has been sintered onto the base element so that the base element forms the abrasive element. A neutral element may be formed, too, which in itself is not part of a removal of material. This means that on the neutral element neither a geometrically defined cutting portion nor a geometrically undefined cutting portion is realized. The neutral element, however, may hold the geometrically defined cutting portion or the first geometrically defined cutting portion and/or the geometrically undefined cutting portion, for example in that the cutting element and/or the abrasive element are/is fixed on the neutral element which then also takes over the function of a base element. The base element and/or neutral element may also be arranged between different elements of the abrasive bead in such a way that it defines a distance between these elements. In this function it may be realized as a neutral element, that is, it is not part of the removal of material itself, as well as it may be part of the removal of material in that it forms the geometrically defined cutting portion or the first geometrically defined cutting portion and/or the geometrically undefined cutting portion. It may, for example, define the distance between two geometrically defined cutting portions. It may, however, also define the distance between a or the geometrically defined cutting portion and a or the geometrically undefined cutting portion. It may also define the distance between two geometrically undefined cutting portions. A length of the base element and/or neutral element may be about 3 to 8 mm, especially 5 to 6 mm.

In one embodiment, the geometrically defined cutting portion is arranged before (with respect to the sawing direction) the geometrically undefined cutting portion or the base element and/or neutral element. The geometrically defined cutting portion engages a part of the workpiece to be worked on before the geometrically undefined cutting portion with respect to time. Possibly it may be advantageous if the geometrically defined cutting portion makes contact with the workpiece first when sawing and takes over the main load. The geometrically defined cutting portion guides the saw rope and evens out possible protruding parts of material which remain after the sawing with the geometrically defined cutting portion, but is protected from a full impact of the workpiece by the geometrically defined cutting portion. In this way, a removal of material due to stress on the geometrically undefined cutting portion is lessened and therefore its lifetime is increased. In this way, the complete lifetime of the cutting bead is increased with respect to prior art.

In one embodiment, the geometrically defined cutting portion is arranged behind (with respect to the sawing direction) the geometrically undefined cutting portion or the base element and/or neutral element. The geometrically defined cutting portion engages the workpiece after the geometrically undefined cutting portion. It is advantageous that the geometrically defined cutting portion recedes behind the geometrically undefined cutting portion and therefore suffers less impact in sawing. The geometrically undefined cutting portion possibly causes a main part of the sawing, especially a higher volumetric removal of material than the geometrically defined cutting portion.

It is also possible for the geometrically defined cutting portion to be arranged before and a further geometrically defined cutting portion to be arranged behind the geometrically undefined cutting portion or the base element and/or neutral element. Configurations of the kind "cutting element-abrasive element-cutting element" or "cutting element-neutral element-cutting element" may result. Multiple combinations can also be chosen, for example "cutting element-abrasive element-cutting element-abrasive element-cutting element". The later geometrically defined cutting portion is protected by the abrasive element or the base element and/or neutral element while at the same time the prior geometrically defined cutting portion takes up the major portion of the sawing and takes up the stress in order to increase the lifetime of the geometrically undefined cutting portion and therefore of the cutting bead as a whole.

In one embodiment, the cutting bead comprises two geometrically defined cutting portions. It is possible for the cutting bead to comprise two cutting element as well as for both cutting portions to be realized on the same cutting element. If two cutting elements are realized, which for example may be arranged on both sides of an abrasive element or a neutral element, the cutting bead may for example have a length between 11 and 12 mm.

In one embodiment, the cutting bead has a cutting element which comprises the or a geometrically defined cutting portion and the cutting bead comprises an abrasive element which comprises the or a geometrically undefined cutting portion. It is possible for the cutting bead to comprise more than one cutting element and/or more than one abrasive element, to comprise one or more base element and/or neutral elements in addition to the cutting element and the abrasive element or for the cutting bead to comprise further elements.

In one embodiment, an outer diameter of the geometrically defined cutting portion of the cutting element is smaller than an outer diameter of the abrasive element or the base element and/or neutral element. The outer diameter of the geometrically defined cutting portion of the cutting element is measured at that point at which the geometrically defined cutting portion of the cutting element has a maximum outer diameter, therefore usually also is a maximum outer diameter of the cutting element and an outer diameter of the cutting edge. In the same way, the outer diameter of the abrasive element or the base element and/or neutral element is a maximum outer diameter if the abrasive element or the base element and/or neutral element does not have a uniform outer diameter.

It is, however, possible that the cutting element or the base element and/or neutral element and the abrasive element has the same or almost the same outer diameter. In this case, the abrasive element is especially suitable for smoothing work on the workpiece done by the cutting element. It is generally possible for the outer diameter of the cutting element to be larger than the outer diameter of the abrasive element or the base element and/or neutral element so that the cutting element takes over a main portion of the removal of material. This embodiment is especially advantageous if the base element does not comprise a geometrically undefined cutting portion or only a neutral element is employed, since in this case the geometrically defined cutting portion of the cutting element fully takes over the removal of material.

In one embodiment, the outer diameter of the geometrically defined cutting portion of the cutting element is more than 0 mm and at maximum 2 mm smaller than the outer diameter of the abrasive element or the base element and/or neutral element. An outer diameter of the geometrically defined cutting portion of the cutting element may be 5 to 15 mm, for example 11 to 12 mm. The outer diameter of the abrasive element or the base element and/or neutral element may be 5 to 15 mm, for example 11 to 12 mm. A difference of the diameters may be less than 1.0 mm or less than 0.5 mm, especially be in the region of 0.1 to 0.3 mm, where the outer diameter of the abrasive element and the base element and/or neutral element is larger than the outer diameter of the geometrically defined cutting portion of the cutting element.

In one embodiment, the cutting element comprises a recess and the cutting element has been joined with the recess onto a socket portion of the abrasive element or the base element and/or neutral element. The recess may be continuous or may comprise steps.

For example, the abrasive element or the base element and/or neutral element may comprise a central portion, where the socket portion in the axial direction follows to the central portion. It is also possible that the abrasive element comprises multiple socket portions which for example may follow to the central portion on both sides in the axial direction. In the socket part then a diameter of the abrasive element or the base element and/or neutral element may be smaller than in the central portion. The cutting element then may have been joined with its recess onto the socket portion. An advantage of such a realization may for example be that the cutting element is stressed in the direction of the central portion in the designated use of the cutting bead on the socket portion and is then able to support itself on the central portion under stress. It is, however, also possible for the cutting element under stress to be pressed away from the central portion. It is also possible that a diameter of the abrasive element or base element and/or neutral element in the socket portion is not different or not fundamentally different from a diameter of the abrasive element or base element and/or neutral element in the central portion. In all cases, the cutting element is additionally fixed in axial direction, as will be explained in more detail in the following.

In a cutting bead with two cutting elements, two socket portions may be realized. The socket portions may comprise a length of 1 to 4 mm or 2 to 3 mm, especially between 2.5 and 2.8 mm. A length of the central portion may then be between 1 and 15 mm or between 7 and 10 mm, especially between 8.5 and 8.8 mm.

The cutting element may have been joined onto the socket portion in any way. "Joining" here shall be the permanent linking of at least two components as defined in DIN 8593. Joining therefore especially comprises putting together, pressing one onto or into the other, welding, soldering, adhesive joining, screwing or bolting the components together and shrinking. It also comprises joining by means of joining elements such as pins, screws or bolts, rivets, feather keys or wedges.

For example, the cutting element may comprise a thread on an inner diameter, where the socket portion comprises a counter thread so that the abrasive element may be screwed onto the socket portion. A screwing is advantageous, since in this way the cutting element, should it have to be replaced, can easily be screwed off the cutting bead and be replaced.

In the same way, the cutting element may also be joined onto the abrasive element or the base element and/or neutral element if this base element and/or neutral element does not comprise a socket portion.

A further solution of the object of the invention is a saw rope which comprises a cutting bead as described above. Comprising a cutting bead shall be understood to mean—as for all other specifications of numbers—that the saw rope comprises at least one cutting bead. The saw rope comprises, for example, 20 to 80 cutting beads per meter or 35 to 40 cutting beads per meter.

In one embodiment, the saw rope comprises a support rope and two cutting beads. A distance element is arranged on the support rope and defines the distance of the two cutting beads.

The support rope may for example be a steel rope. Any other suitable material can, however, be chosen of which ropes may be realized which are able to withstand the high impacts in sawing. The support rope may have a diameter below 10 mm, for example between 3 and 6 mm.

As a distance element, for example, a plastic element may be chosen. The plastic element may be elastic so that during sawing it may cushion shifts between the saw beads occurring during sawing. The distance element may also be realized with a spring, for example a steel spring. The steel spring may also cushion distance shifts of the cutting beads. An elastic distance element defines an equilibrium position for the distance of neighbouring cutting beads. The distance element may, however, also be inelastic so that the distances between the cutting beads is fixed.

The saw rope may also comprise a sheathing which radially covers the distance element and a segment of the cutting bead. The sheathing may have a rough surface. If, however, it is smooth, the sheathing gives the saw rope a smooth surface in regions remote from the cutting beads. Waste particles occurring in sawing are turned away by the sheathing. In this way, the waste particles cannot end up between the different elements of the saw rope, for example between the support rope and the distance element, the distance element and the cutting bead or even in the cutting bead. Furthermore, waste particles cannot accumulate in the distance element if this for example is realized as a spring. The sheathing is preferably designed in such a way with respect to coupling portions, length and/or contour that it still covers a small part of the cutting bead and is supported on or fixed to this part of the cutting bead or axially tensioned between neighbouring cutting beads. In this way, in a saw rope with multiple cutting beads the surface of the saw rope apart from the cutting beads is nearly completely covered with several sheathings (multiple sheathing elements) and for the waste particles it is impossible or at least made highly difficult to end up below the sheathing. The sheathing therefore serves as protection for the saw rope, especially of wear and tear. As the only part of the saw rope all geometrically defined cutting portions and geometrically undefined cutting portions or a surface of the neutral element (possibly only a surface of the central portion of the neutral element), if such a neutral element is present, may not be covered by the sheathing and radially extend over the sheathing. Preferably, the sheathing is realized elastically and especially made of plastic.

Generally, the cutting bead may have been joined onto the support rope in any way. Especially, the support rope does not have to comprise a thread in order to achieve this. In one embodiment, the cutting bead has been screwed onto a thread of any thread geometry fixed onto the support rope. In order to achieve this, the cutting bead on an interior diameter comprises a thread. The support rope may then comprise a counter thread onto which the cutting bead may be screwed. The outer thread may be realized with a holding element which on the support rope may for example be adhesively fixed, soldered, pressed or welded. The thread and the counter thread may have any diameter lying between the outer diameters of the support rope and the cutting bead and which guarantees a sufficient wall thickness of the cutting bead. Preferably, however, a thread is chosen which especially lies between M3 and M8 according to the ISO definition for metrical threads. Especially, an M6 thread is chosen. In this way, the cutting bead can be screwed off the support rope should it have to be replaced. In this way the cutting bead can be replaced by another cutting bead in a simple way without the saw rope having to be destroyed for the replacement of the cutting bead. If the cutting bead has not been screwed onto the support rope, the cutting bead can still comprise a thread. The thread can serve for a material of the sheathing, for example plastic, entering between the cutting bead and the support rope and therefore into the thread of the cutting bead and in this way fixing the cutting bead onto the support rope in an additional way. In the same way, the thread can also serve for accommodating an adhesive. However, other not thread-like recesses, grooves or notches may be present to this end.

A saw rope according to the invention may be used with a cutting speed between 300 and 400 m/min with a saw cut depth at each pass or an infeed between 5 and 30 µm. Saw ropes according to prior art are generally used with a cutting speed of 1,000 to 2,000 m/min with a saw cut depth at each pass or an infeed of less than 0.5 µm per bead. If under these conditions Bianco Carrara marble is cut with water cooling, with the saw rope a cutting rate (area cut per time unit) of 21.6 m$^2$/h may be reached, while saw ropes according to prior art reach only 1.2 m$^2$/h. Therefore, the saw rope according to the invention may have a much higher feed rate than known from prior art. The saw rate for example is increased to 18 times compared to the saw rate known from prior art. In saws working with multiple saw ropes (multi-rope grinding machines) in this way an increase of the cutting rate to 1,224 m$^2$/h may be expected if 60 ropes are employed.

In a method according to the invention, a saw rope, especially a saw rope as described above, is manufactured by joining a cutting element and an abrasive element or a neutral element together, forming a cutting bead with the cutting element and the abrasive element or the neutral element and joining the cutting bead onto a support rope. Generally, it is also possible to put the different elements with which the cutting bead is formed onto the support rope separately or joined into construction groups and to join them there. Possibly, however, the cutting bead is joined as a whole and subsequently the cutting bead joined onto the support rope as a whole.

The cutting element and the abrasive element are linked in any way. Preferably, the abrasive element or the neutral element comprises a socket portion onto which the cutting element is pushed and joined as explained above, especially screwed.

The cutting bead may be completely formed with the joining of the cutting element and the abrasive element or neutral element. It is, however, also possible that further elements are added to the cutting element and the abrasive element or the neutral element, for example a further cutting element or a further abrasive element or neutral element and a further cutting element. For this embodiment, however, all elements forming the cutting bead are joined so that the cutting bead is complete. The cutting bead is only joined onto the support rope when it is complete. For manufacturing the saw rope, apart from the cutting beads further elements may be put onto the support rope, especially distance elements and/or a sheathing.

In one embodiment, the cutting bead as described above is screwed onto a thread fixed to the support rope. Generally, it is possible to join the bead to the support rope in any way as described. Preferably, however, the cutting bead is screwed onto the thread fixed to the support rope. The thread may have been joined onto the support rope in any way itself, for example been adhesively fixed, welded or soldered.

Advantageous developments of the invention result from the claims, the description and the drawings. The advantages of features and of combinations of a plurality of features mentioned at the beginning of the description only serve as examples and may be used alternatively or cumulatively without the necessity of embodiments according to the invention having to obtain these advantages. Without changing the scope of protection as defined by the enclosed claims, the following applies with respect to the disclosure of the original application and the patent: further features may be taken from the drawings, in particular from the illustrated designs and the dimensions of a plurality of components with respect to one another as well as from their relative arrangement and their operative connection. The combination of features of different embodiments of the invention or of features of different claims independent of the chosen references of the claims is also possible, and it is motivated herewith. This also relates to features which are illustrated in separate drawings, or which are mentioned when describing them. These features may also be combined with features of different claims. Furthermore, it is possible that further embodiments of the invention do not have the features mentioned in the claims.

The number of the features mentioned in the claims and in the description is to be understood to cover this exact number and a greater number than the mentioned number without having to explicitly use the adverb "at least". For example, if a cutting element is mentioned, this is to be understood such that there is exactly one cutting element or there are two cutting elements or more cutting elements. Additional features may be added to these features, or these features may be the only features of the respective product.

The reference signs contained in the claims do not limit the extent of the matter protected by the claims. Their sole function is to make the claims easier to understand.

BRIEF DESCRIPTION OF THE DRAWINGS

In the following, the invention is further explained and described with respect to preferred exemplary embodiments illustrated in the drawings.

DETAILED DESCRIPTION

Figure 1:
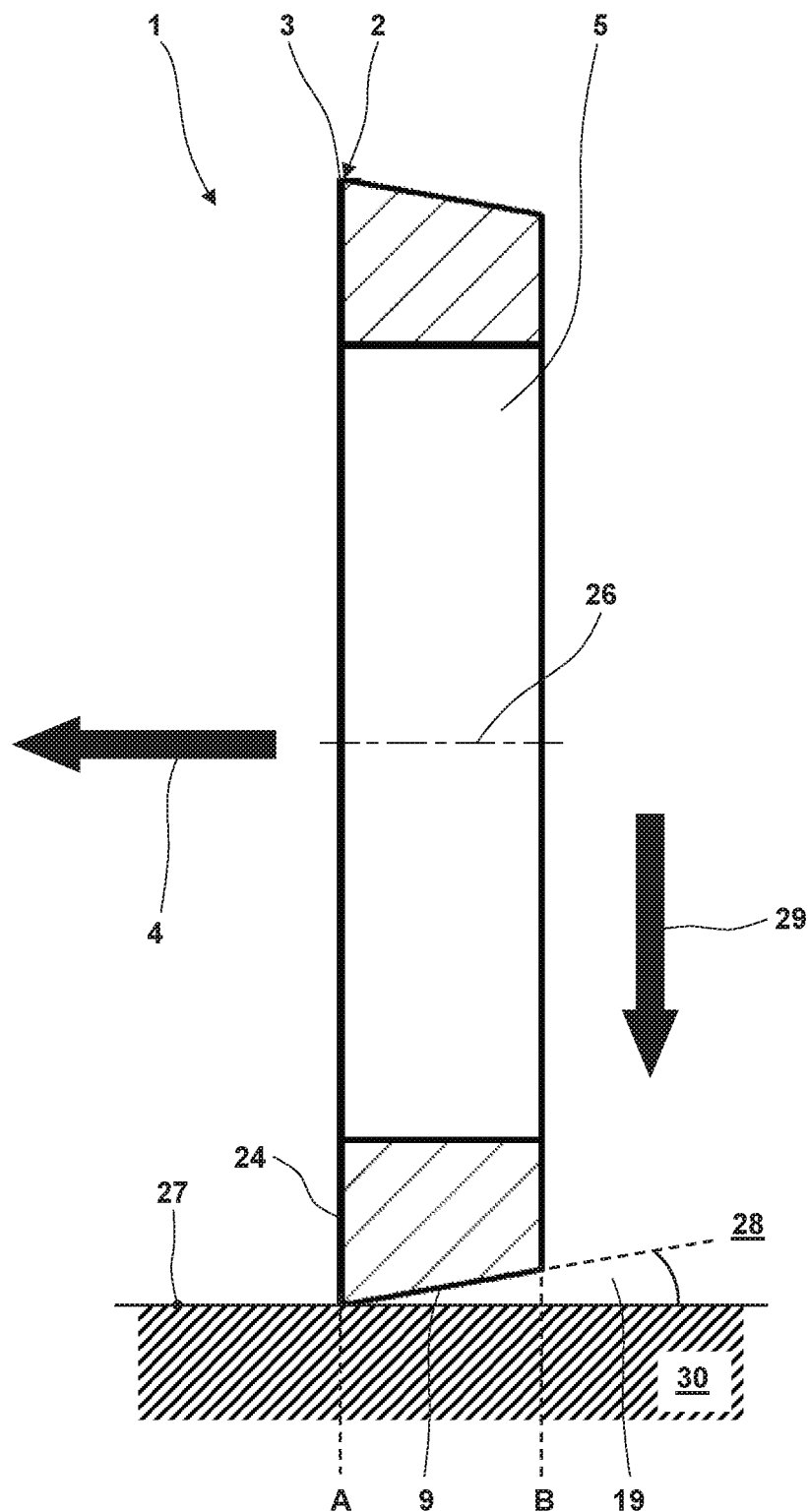
FIG. 1 shows a cutting element of a cutting bead in a longitudinal section along a feed direction.

FIG. 1 shows a cutting element 1 for a cutting bead 13. On the cutting element 1, a geometrically defined cutting portion 2 is realized. The geometrically defined cutting portion 2 comprises a cutting edge 3 for which a cutting edge geometry may be chosen which comprises roundings (radii)

and/or bevels. The cutting edge 3 is formed by a cutting surface 24 and a clearance surface 9. The geometrically defined cutting portion 2 comprises a clearance angle 19 formed by the clearance surface 9 with respect to a longitudinal axis 26 and an interior surface 27 of the sawing channel 28. The cutting element 1 is moved on the saw rope 15 in a sawing direction 4 and at the same time moved through a workpiece 30 in a feed direction 29 oriented vertically to the sawing direction 4.

Generally, the geometrically defined cutting portion 2 may have any clearance angle 19 lying between 0° and 90°. The clearance angle 19 may for example be more than 0° but less than 20°. It may especially lie between 5° and 15°, between 8° and 12° or between 9° and 11°.

The cutting element 1 tapers between two axial sections A and B. The axial section A lies before the axial section B. In the axial section A, the cutting edge 3 is arranged. Therefore, the axial section A is the axial section which interacts with the workpiece 30 before axial section B enters into the workpiece. The cutting element 1 therefore tapers against the sawing direction 4 and away from the cutting edge 3. The cutting edge 3 therefore engages the workpiece 30.

If the taper as shown in FIG. 1 is uniform and cone-shaped, a complete outer surface of the cutting element 1 forms the clearance surface 9 defining the clearance angle 19. It is possible that the taper is chosen in non-continuous way, for example as a wave-like or step-like contour. In this case it is possible for the cutting element 1 to taper while the clearance angle 19 is 0°.

The cutting element 1 in its centre forms a recess 5. This recess here is shown as a through-recess 12. Consequently, the cutting element 1 shown in FIG. 1 is roughly annular. The annular shape is formed as the shape of a truncated cone where in the region of axial section A a base surface and in axial section B a top surface of the truncated cone is formed. The cutting element 1, however, can also have other geometries.

Figure 2:
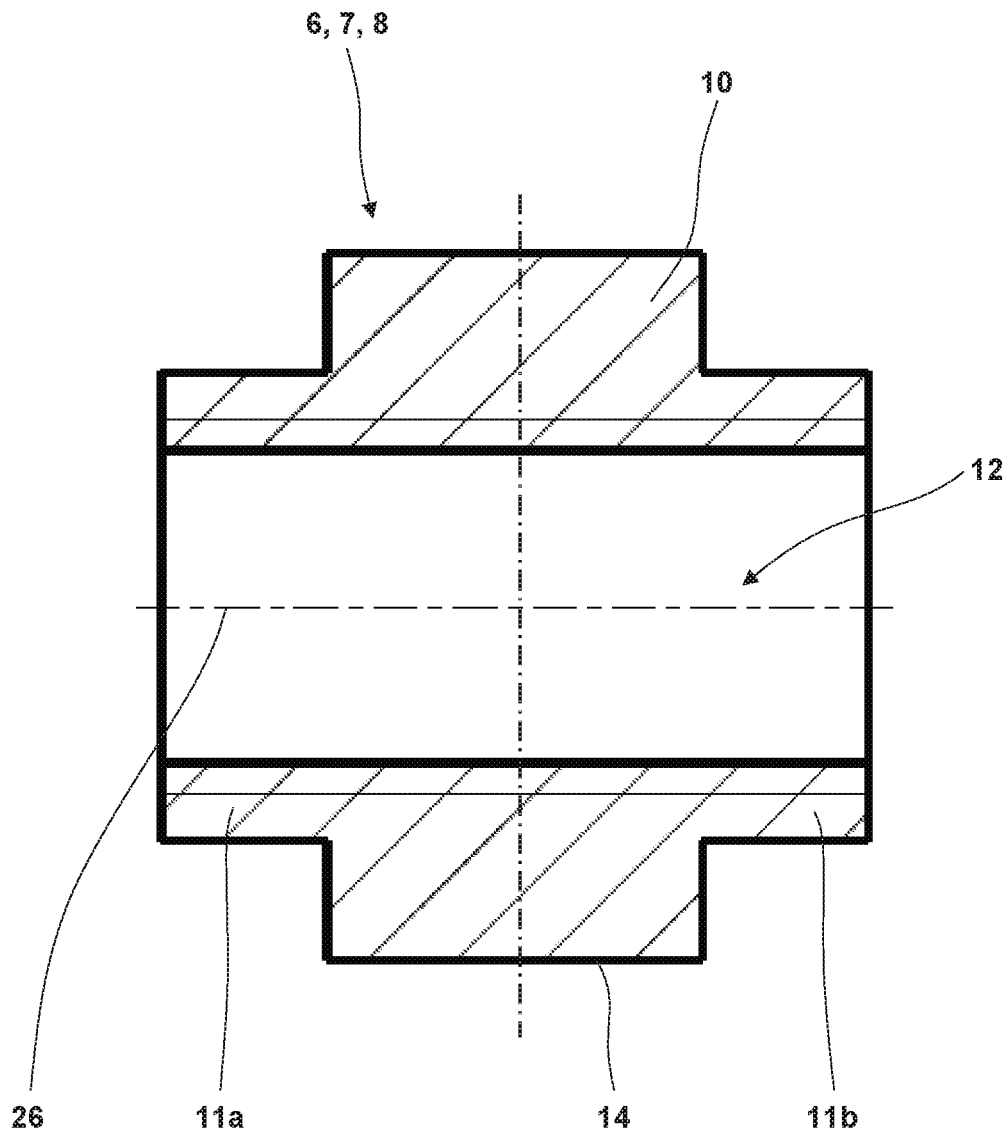
FIG. 2 shows an abrasive element, base element or neutral element of a cutting bead in a longitudinal section.

The element shown in FIG. 2 may be an abrasive element 6 or a base element 7 and/or neutral element 8. All embodiments shown in FIGS. 2 to 8 may be realized with an abrasive element 6 as well as with a base element and/or neutral element 7, 8. The abrasive element 6 in the region of its e.g. cylindrical outer surface comprises a geometrically undefined cutting portion 14. The neutral element 8 does not comprise a geometrically undefined cutting portion and itself does not take part in the removal of material. The neutral element 8 therefore does not comprise a geometrically defined cutting portion either. It is, however, possible for a base element 7 to comprise no geometrically defined cutting portion but a geometrically undefined cutting portion 14 or no geometrically undefined cutting portion but a geometrically defined cutting portion 2 and therefore to take part in the removal of material. In the following, the element shown in FIG. 2 is referred to as a base element 7 without the invention being intended to be limited by this. The base element 7 each can also form an abrasive element 6 or a neutral element 8.

The base element 7 according to FIG. 2 comprises a central portion 10 in which the base element 7 comprises a cylindrical outer surface. In an axial direction of the base element 7 two sleeve-like socket portions 11a, 11b join the central portion 10. In the region of the socket portions 11a, 11b, the base element 7 also comprises cylindrical outer surfaces. In the region of the socket portions 11, the base element 7 comprises a smaller outer diameter than in the central portion 10, while the inner diameters of the socket portions 11a, 11b and the central portion 10 are the same, in which way a cylindrical opening 12 is formed. Generally, the base element 7 can have any suitable geometry, especially suitable variations of a cylindrical shape, for example with uniform or varying diameters. Realizing the socket portion 11, however, is especially advantageous for joining the cutting element 1 onto the base element 7.

Advantageously, an outer diameter of the socket portion 11 is chosen in such a way that with an interior diameter of the recess 5 in the cutting element 1 it forms a clearance fit, transition fit or press fit. It is also possible for the socket portion 11 to comprise an outer thread which may engage with an inner thread in the recess 5 of the cutting element 1.

The through-recess 12 may be realized in the way shown in FIG. 2 without a structure. It is, however, also possible for the through-recess 12 to comprise an inner thread. Such an inner thread may lie between M3 and M8 according to the ISO definition for metrical threads, especially it may be an M6 thread.

If the base element 7 is realized with a geometrically undefined cutting portion 14 and/or as an abrasive element 6, the cutting portion may be realized with diamond. Any suitable diamond may be chosen, for example MCD or PCD.

Figure 3:
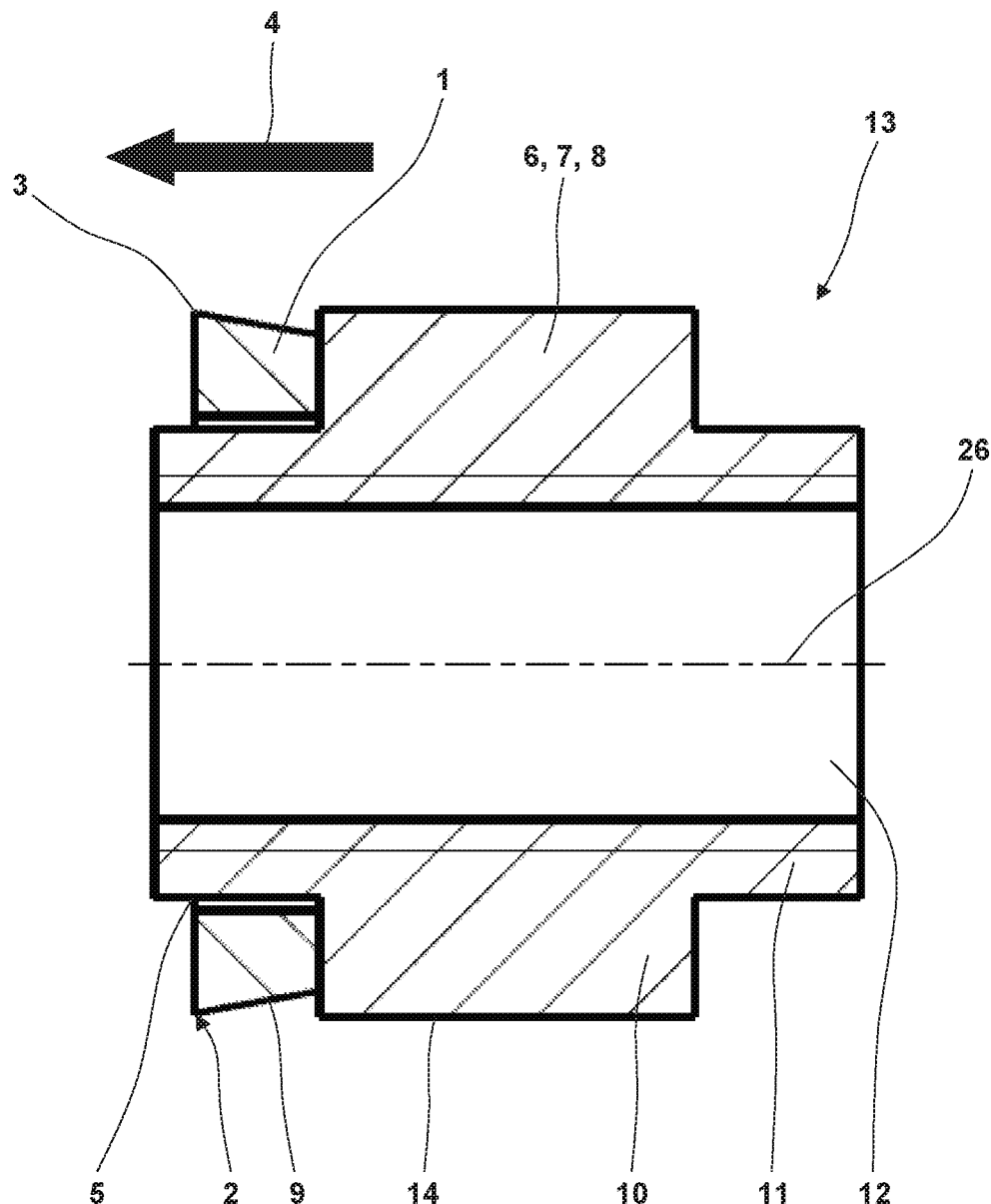
FIG. 3 shows a cutting bead in which a cutting element is arranged before an abrasive element, base element or neutral element in a longitudinal section.

FIG. 3 shows a cutting bead 13. The cutting element 1 has been pushed onto the base element 7 with its recess 5. If on the socket portion 11 and the cutting element 1 each a thread is present, the cutting element 1 may have been screwed onto the socket portion 11. The cutting element 1 may, however, have been joined to the socket portion in any other way, for example joined adhesively, welded, soldered or held with a press fit. Base element 7 and cutting element 1 together form the cutting bead 13.

The arrow in FIG. 3 illustrates a direction of movement of the cutting bead 13 (and a saw rope 15) in a designated use, that is, the sawing direction 4. The cutting element 1 is arranged before the base element 7. The cutting element 1 together with the abrasive element 6 may take over the cutting effect, where the cutting element 1 engages the workpiece 30 before the abrasive element 6 engages the workpiece 30.

Figure 4:
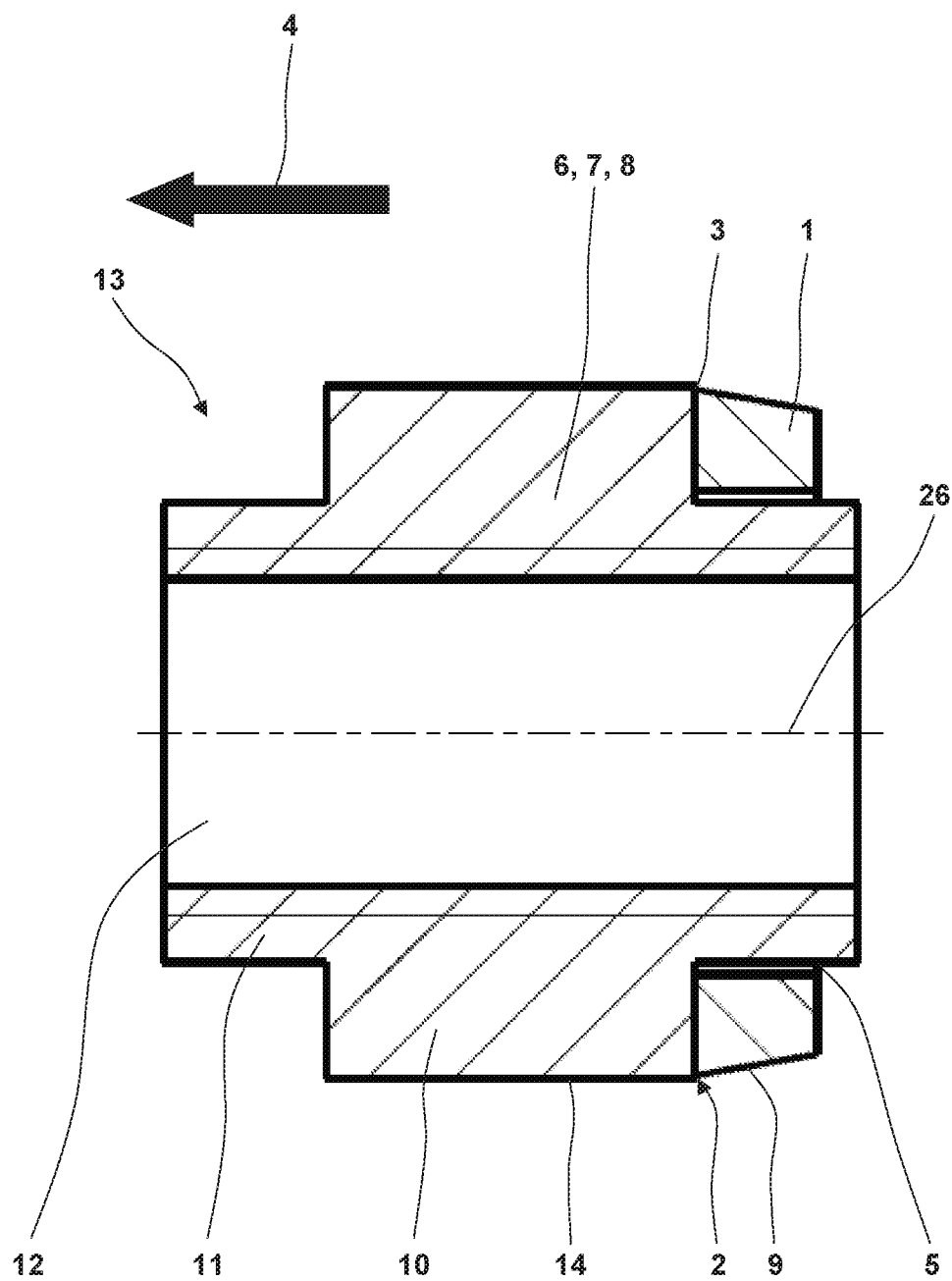
FIG. 4 shows a cutting bead in which a cutting element is arranged behind an abrasive element, base element or neutral element in a longitudinal section.

FIG. 4 shows a cutting bead 13 in which in contrast to the cutting bead 13 from FIG. 3 the cutting element 1 is arranged behind the base element 7. The cutting edge 3 of the cutting element 1 is arranged on the side of the base element 7 turned towards the central portion 10. If the base element 7 is realized as an abrasive element 6, at first the abrasive element 6 engages with the workpiece 30 with the geometrically undefined cutting portion 14, before the cutting element 1 engages with the workpiece 30 with the geometrically defined cutting portion 2 (supposing that the diameter of the cutting element 1 is at least slightly larger than the diameter of the abrasive element 6).

Figure 5:
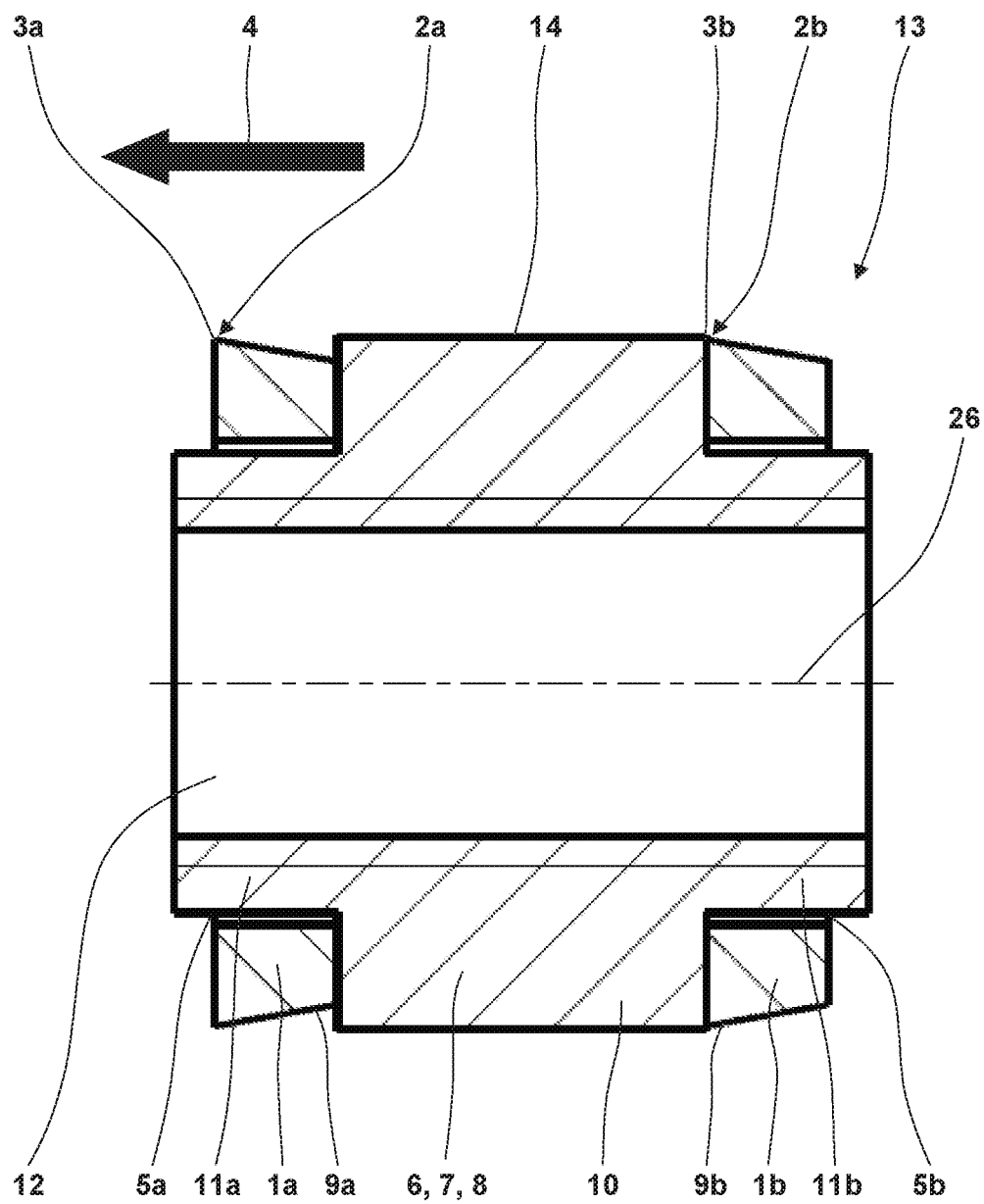
FIG. 5 shows a cutting bead in which a cutting element is arranged before an abrasive element, base element or neutral element and a further cutting element is arranged behind the abrasive element, base element or neutral element in a longitudinal section.

FIG. 5 shows a cutting bead 13 comprising two cutting elements 1a, 1b. The cutting element 1a is arranged before the base element 7 and the other cutting element 1b is arranged behind the base element 7. If the cutting bead 13 engages the workpiece 30 (not shown), at first the geometrically defined cutting portion 2a of the cutting element 1a is effective on the workpiece 30. Subsequently, the geometrically undefined cutting portion 14 is effective on the workpiece 30 if the base element 7 is realized as an abrasive element 6. Subsequently, the second geometrically defined cutting portion 2b of the second cutting element 1b comes into effect (supposing the diameters of the elements 1a, 7 and 1b are at least slightly increasing). The base element 7, however, can also be realized as a neutral element 8. In this case, only the two geometrically defined cutting portions 2a and 2b are effective on the workpiece 30, while the neutral element 8 keeps the two cutting elements 1a and 1b and therefore the geometrically defined cutting portions 2a and 2b at a defined distance.

A cutting bead 13 according to FIG. 5 with two cutting elements may have a higher length than a cutting bead according to FIG. 3 or FIG. 4 with just one cutting element 1. A length may be between 11 and 12 mm.

In the embodiments shown as according to FIGS. 3, 4 and 5, the outer diameters of the cutting element 1 (a maximum outer diameter of the cutting edge 3 measured in axial section A) and of the abrasive element 6 are always approximately the same. Such an embodiment may be employed independently of the base element 7 having a geometrically undefined cutting portion 14 or not. If the base element 7 does have a geometrically undefined cutting portion 14, it smoothes the workpiece after or before a removal of material by the geometrically defined cutting portion 2. It is, however, also possible for the outer diameters to deviate from one another. The outer diameter of the cutting element 1 may be smaller than that of the base element 7. The difference of the diameters may be less than 1.0 mm or 0.5 mm, especially between 0.1 to 0.3 mm. The outer diameter of the cutting element 1, however, may also be larger than the outer diameter of the base element 7.

Figure 6:
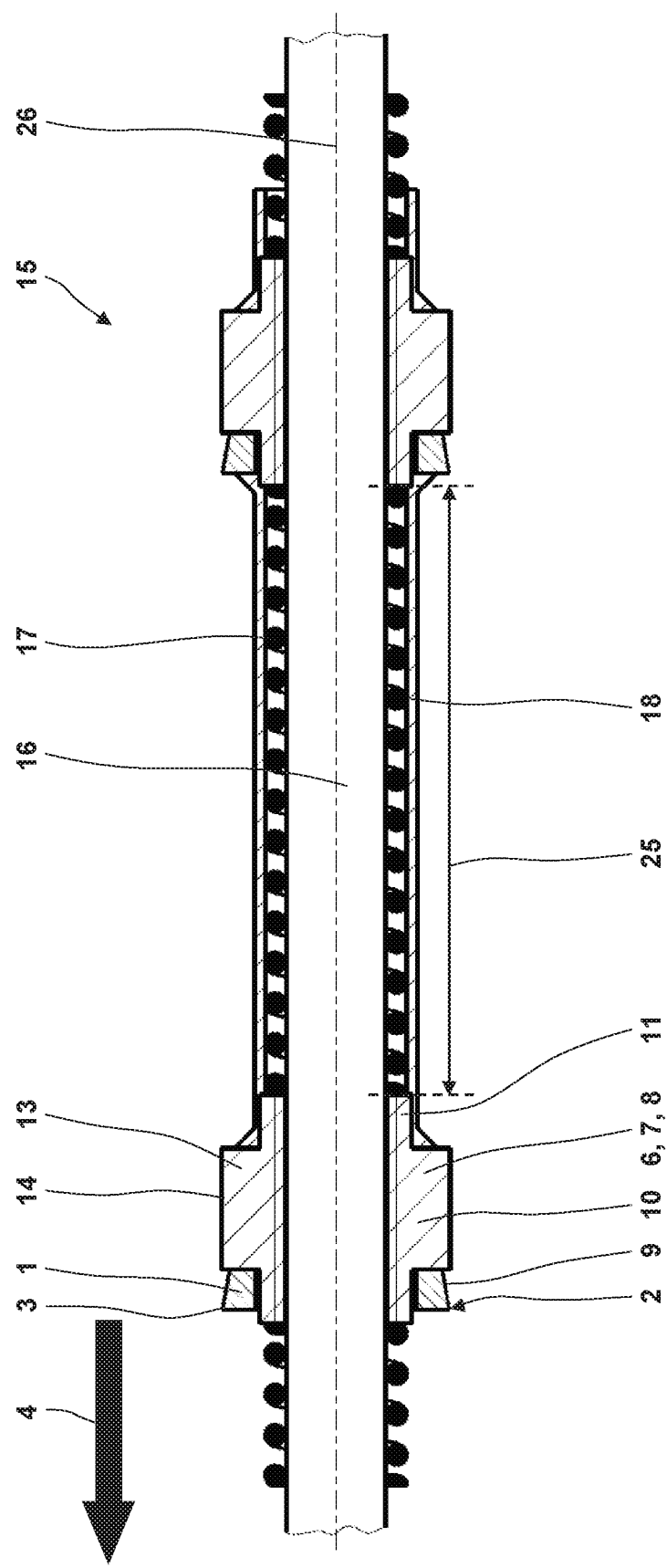
FIG. 6 shows a saw rope with a cutting bead according to FIG. 3 in a longitudinal section.

FIG. 6 shows a saw rope 15. The saw rope 15 is formed with a support rope 16. On the support rope 16, cutting beads 13 are arranged in regular intervals. The cutting beads 13, however, may be arranged in irregular intervals. FIG. 6 only shows a cutout from the saw rope 15.

Figure 7:
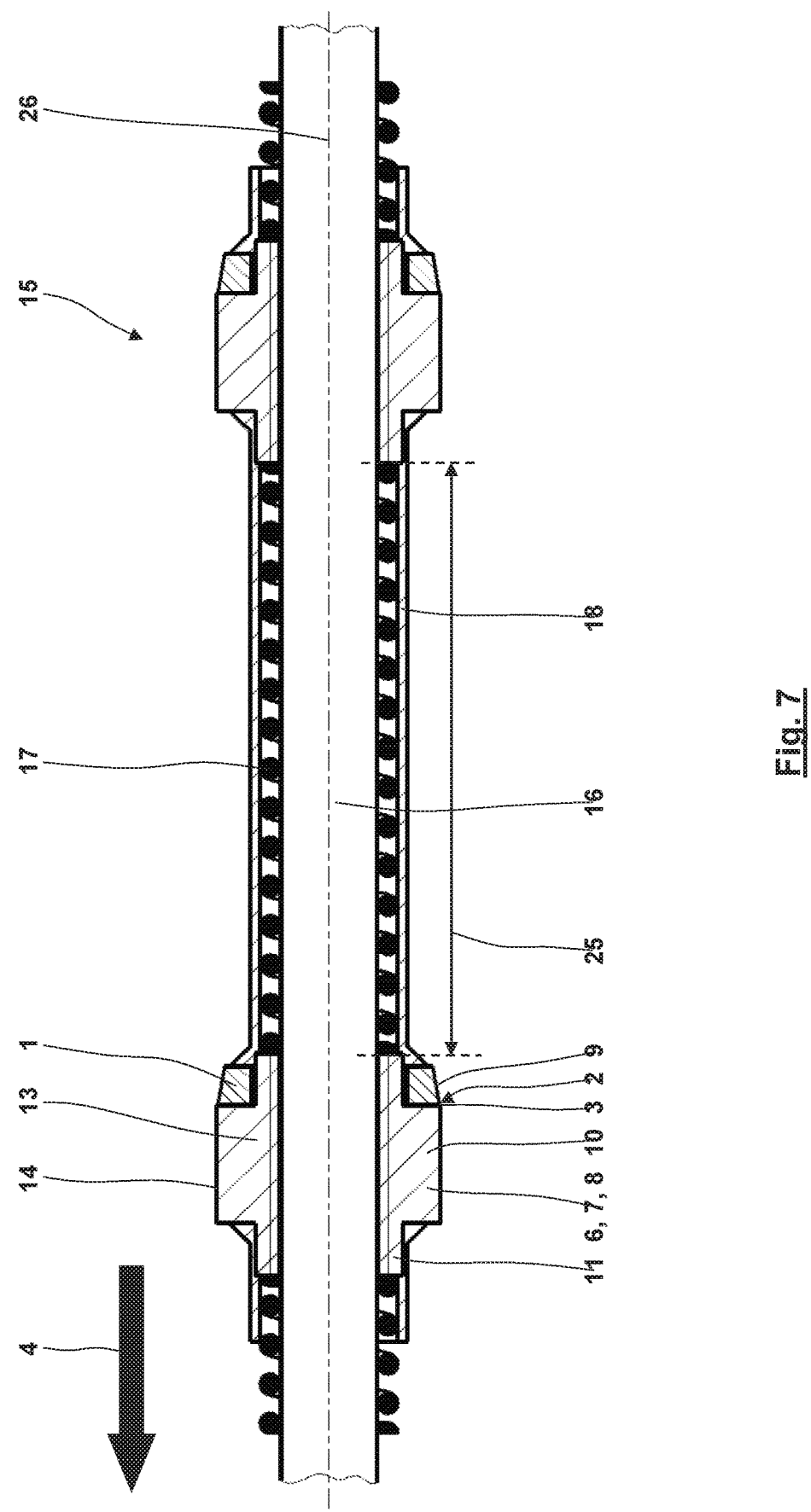
FIG. 7 shows a saw rope with a cutting bead according to FIG. 4 in a longitudinal section.
Figure 8:
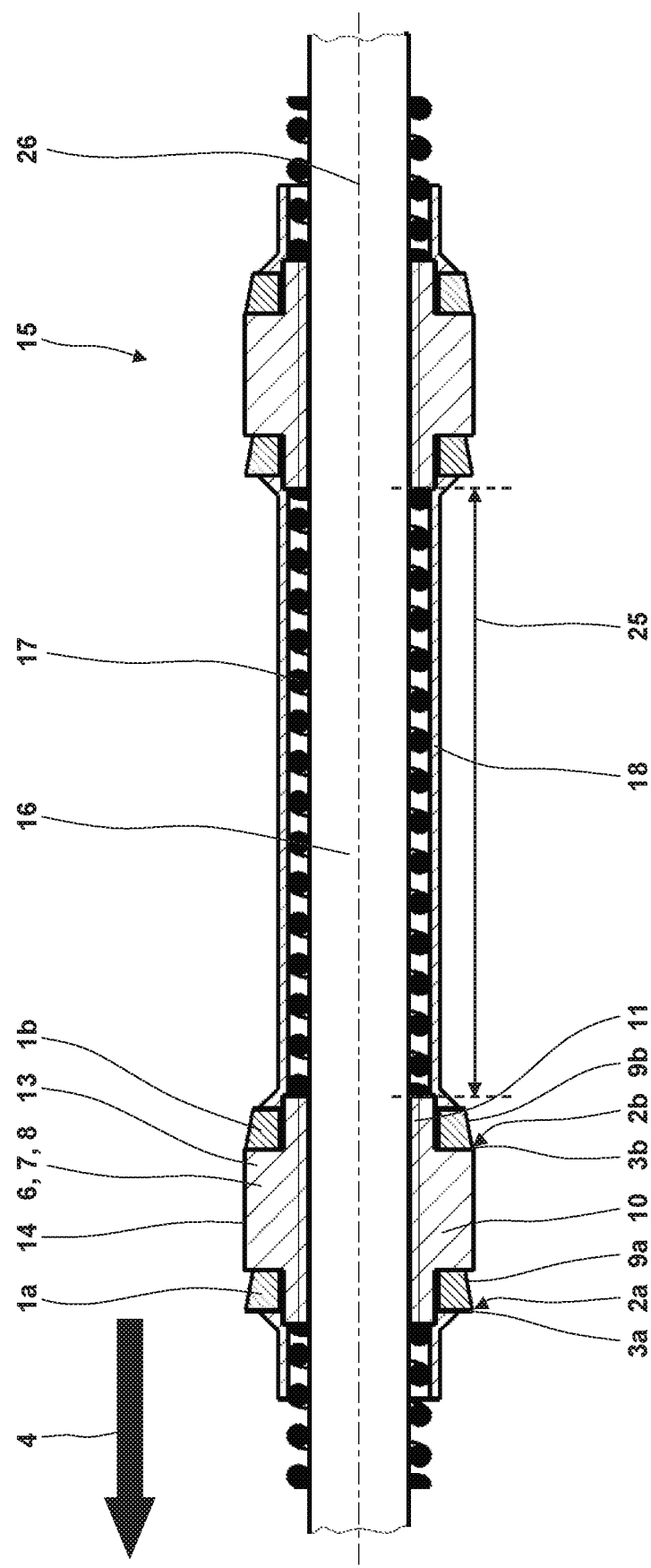
FIG. 8 shows a saw rope with a cutting bead according to FIG. 5 in a longitudinal section.

FIG. 6 shows a saw rope 15 with a cutting bead 13 according to FIG. 3, in which the cutting element 1 is arranged before the base element 7. FIGS. 7 and 8 show saw ropes 15 with cutting beads 13 according to FIG. 4 (FIG. 7) or FIG. 5 (FIG. 8).

It is also imaginable for a saw rope 15 to comprise different cutting beads 13. For example, a part of the cutting beads 13 may be realized as one piece, while another part of the cutting beads 13 comprises a cutting element 1 and an abrasive element 6. One part of the cutting beads 13 may have the cutting element 1 before the abrasive element 6 when seen against the sawing direction 4 (FIG. 3) and another part of the cutting beads 13 may have it behind the abrasive element 6 (FIG. 4). It is alternatively or cumulatively possible for cutting beads 13 with different outer diameters or contours to be used. Cuttings beads 13 according to the invention may also be combined with cutting beads known from prior art which comprise only one geometrically undefined cutting portion. Every other possible combination of cutting beads 13 according to the invention with each other or with known cutting beads is also possible.

Between the cutting beads 13 a distance element 17 is arranged around the support rope 16. The distance element 17 is realized as a spring. The distance element 17, however, may take on any other suitable form. For example, the distance element 17 apart from a spring, for example a steel spring, may also be a sheath-like plastic element arranged around the support rope 16. The plastic element may be elastic. Multiple distance elements 17 may have the same length, as shown in FIGS. 6, 7 and 8, and therefore define regular distances 25 between the cutting beads 13. It is also possible, however, for multiple distance elements 17 to comprise different lengths and therefore to define irregular distances 25 between the cutting beads 13.

The distance element 17 is covered by a sheathing 18. The sheathing 18 may be elastic and for example be realized from plastic. The sheathing 18 covers the distance element 17 in such a way that it is protected of dust and dirt. In this way, especially waste particles cannot enter into the distance element 17. The sheathing 18 is also formed in such a way that it reaches up to the cutting bead 13 or partially overlaps with it. In FIGS. 6, 7 and 8 it is shown that the sheathing 18 in those places where the socket portion 11 of the cutting bead 13 is free overlaps the socket portion 11, lies against the central portion 10 of the cutting bead 13 and comprises a conical outer surface. On the other side of the cutting bead 13, an end portion of the sheathing 18 with a conical outer surface is formed. This end portion covers part of the socket portion 11 and rests against the cutting element 1. In this way, the only parts of the cutting bead 13 which are free and are not protected by the sheathing 18 are the geometrically defined cutting portion 2 and, if the base element 7 is realized as an abrasive element 6, the geometrically undefined cutting portion 14. All other parts of the cutting bead 13 and the rest of the saw rope 15 which do not enter into contact with the workpiece 30 are covered by the sheathing 18 and in this way are protected of waste particles and wear.

If the cutting bead 13 comprises a thread, it may have been screwed onto the support rope 16 in a way not shown. It may, however, have been joined onto the support rope 16 in any other way, for example been adhesively joined, welded or soldered.

Figure 9:
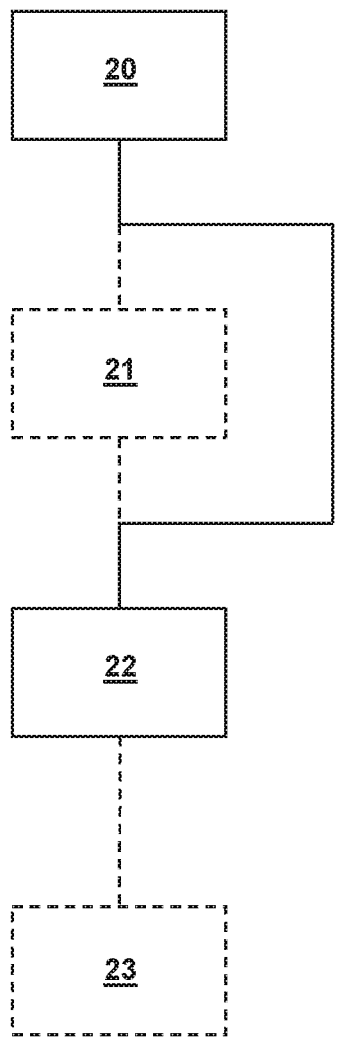
FIG. 9 schematically shows a method for manufacturing a saw rope with a cutting bead.

With the method illustrated in FIG. 9, a saw rope 15 may be manufactured. In a step 20, a cutting element 1 with a geometrically defined cutting portion 2 and an abrasive element 6 with a geometrically undefined cutting portion 14 or a neutral element 8 are joined. Any known and suitable joining method may be chosen.

A cutting bead 13 may already be formed in step 20. It is, however, also possible that in an optional step 21 further elements are added to the cutting element 1 and the abrasive element 6 so that a cutting bead 13 is formed. For example, further cutting elements 1, (further) abrasive elements 6 or (further) neutral elements 8 or any other elements may be added.

In a step 22, the cutting bead 13 is joined onto a support rope 16. Any of the above-mentioned joining methods may be chosen, for example adhesive joining, welding or soldering. Especially, however, on the cutting bead 13 a thread may be formed with which the cutting bead 13 is screwed onto a counter-thread formed on the support rope 16. The counter-thread may also be joined onto the support rope 16 in any suitable way. It is possible that a saw rope 15 is already formed in step 22.

It is also possible, however, that in a step 23 further elements are added onto the support rope 16. For example, a distance element 17 and/or a sheathing 18 as described above may be joined onto the support rope 16. If multiple cutting beads 13 are arranged on the support rope 16, the distance elements 17 may be arranged between the cutting beads 13 in such a way that they define a distance 25 of the cutting beads 13. The distance 25 of the cutting beads 13 may be chosen to be regular. The distance elements 17, however, may also comprise different longitudinal extensions and in this way define different distances 25. The sheathing 18 may be applied in such a way that it only covers the distance element 17. Preferably, however, the sheathing 18 is applied in such a way that a part of the cutting bead 13 is also covered by the sheathing 18.

Figure 10:
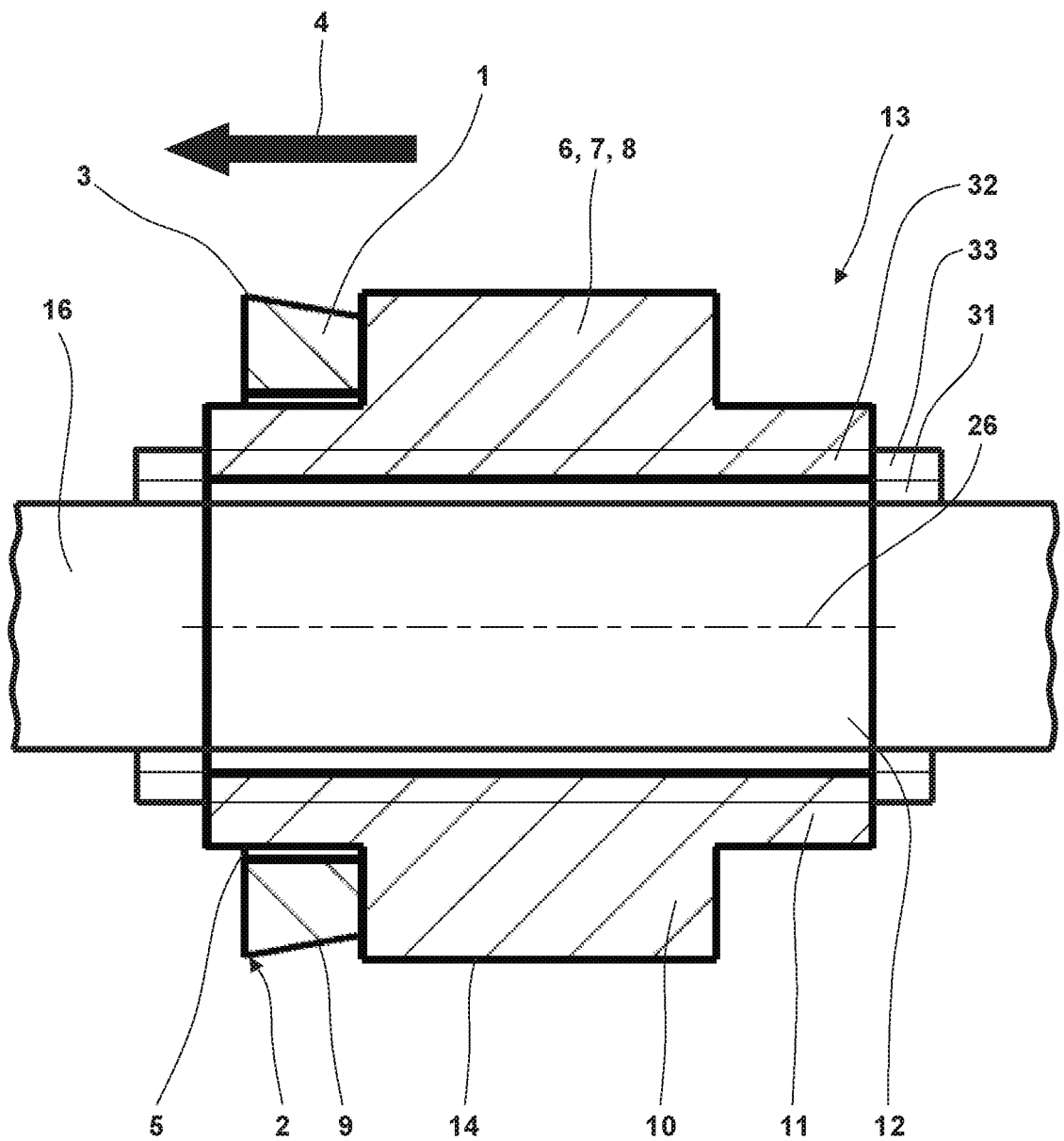
FIG. 10 shows a cutting bead in which a cutting element is arranged before an abrasive element, base element or neutral element together with a mounting element and a saw rope in a longitudinal section.

FIG. 10 shows a cutting bead 13 analogous to the cutting bead 13 shown in FIG. 3. The cutting bead 13 comprises an inner thread 32. A holding element 31 is fixed onto the support rope 16 e.g. by being adhesively fixed, soldered, pressed or welded to the support rope 16. The holding element 31 comprises a counter thread 33 onto which the cutting bead 13 is screwed.

Many variations and modifications may be made to the preferred embodiments of the invention without departing substantially from the spirit and principles of the invention. All such modifications and variations are intended to be included herein within the scope of the present invention, as defined by the following claims.

We claim:

1. A cutting bead for a saw rope, that in a designated use for sawing a workpiece is moved in a sawing direction, comprising
   a first, geometrically defined cutting portion,
   a contour tapering in the sawing direction, said contour beginning at the geometrically defined cutting portion, and
   a further, second cutting portion, where
      the further, second cutting portion is a geometrically undefined cutting portion or
      the further, second cutting portion is a geometrically defined cutting portion,
   wherein the cutting bead comprises a neutral element supporting the first, geometrically defined cutting portion and the further cutting portion,
   defining a distance between the geometrically defined cutting portion and the further, second cutting portion and
   not participating in removing material.

2. The cutting bead of claim 1, wherein the first, geometrically defined cutting portion comprises a clearance angle larger than 0°.

3. The cutting bead of claim 2, wherein the clearance angle is in a range between 9° and 11°.

4. The cutting bead of claim 1, wherein the first, geometrically defined cutting portion comprises a cutting edge architecture.

5. The cutting bead of claim 1, wherein the first, geometrically defined cutting portion comprises a superhard cutting material.

6. The cutting bead of claim 5, wherein the superhard cutting material is diamond material.

7. The cutting bead of claim 1, wherein the second, geometrically undefined cutting portion comprises a diamond material.

8. The cutting bead of claim 1, wherein the cutting bead comprises a base element, the first, geometrically defined cutting portion or the second further cutting portion being arranged on and fixed to the base element.

9. The cutting bead of claim 1, wherein the cutting bead comprises a base element or neutral element which defines a distance between the first geometrically defined cutting portion and the further, second cutting portion.

10. The cutting bead of claim 1, wherein the first, geometrically defined cutting portion is arranged in front of the further, second cutting portion, so that the first, geometrically defined cutting portion engages with a material region of the workpiece earlier than the further, second cutting portion.

11. The cutting bead of claim 1, wherein the first, geometrically defined cutting portion is arranged behind the further, second cutting portion, so that the first, geometrically defined cutting portion engages with a material region of the workpiece later than the further, second cutting portion.

12. The cutting bead of claim 1, wherein
   the cutting bead comprises a cutting element and an abrasive element formed separately from one another,
   the cutting element comprises the first, geometrically defined cutting portion and
   the abrasive element comprises the second, geometrically undefined cutting portion.

13. A saw rope, that in a designated use for sawing a workpiece is moved in a sawing direction, comprising the cutting bead of claim 1.

14. A cutting bead for a saw rope, that in a designated use for sawing a workpiece is moved in a sawing direction, comprising
   a first, geometrically defined cutting portion,
   a contour tapering in the sawing direction, said contour beginning at the geometrically defined cutting portion, and
   a further, second cutting portion, where
      the further, second cutting portion is a geometrically undefined cutting portion or
      the further, second cutting portion is a geometrically defined cutting portion,
   wherein
      the cutting bead comprises a cutting element and an abrasive element formed separately from one another,
      the cutting element comprises the first, geometrically defined cutting portion and
      the abrasive element comprises the second, geometrically undefined cutting portion,
      wherein an outer diameter of the first, geometrically defined cutting portion of the cutting element is smaller than an outer diameter of the abrasive element.

15. The cutting bead of claim 14, wherein a difference between the outer diameter of the first, geometrically defined cutting portion of the cutting element and the outer diameter of the abrasive element is in the range of 0 mm to by 2 mm.

16. A cutting bead for a saw rope, that in a designated use for sawing a workpiece is moved in a sawing direction, comprising
   a first, geometrically defined cutting portion,
   a contour tapering in the sawing direction, said contour beginning at the geometrically defined cutting portion, and
   a further, second cutting portion, where
      the further, second cutting portion is a geometrically undefined cutting portion or
      the further, second cutting portion is a geometrically defined cutting portion,
   wherein
      the cutting bead comprises a cutting element and an abrasive element formed separately from one another,
      the cutting element comprises the first, geometrically defined cutting portion and
      the abrasive element comprises the second, geometrically undefined cutting portion,
   wherein
      the cutting element comprises a recess and
      a base portion of the abrasive element extends in the recess of the cutting element.

17. A saw rope, that in a designated use for sawing a workpiece is moved in a sawing direction, comprising a cutting bead for a saw rope, that in a designated use for sawing a workpiece is moved in a sawing direction, comprising a first, geometrically defined cutting portion, a contour tapering in the sawing direction, said contour beginning at the geometrically defined cutting portion, and a further, second cutting portion, where the further, second cutting portion is a geometrically undefined cutting portion or the further, second cutting portion is a geometrically defined cutting portion, wherein the cutting bead comprises a cutting element and an abrasive element formed separately from one another, the cutting element comprises the first, geometrically defined cutting portion and the abrasive element comprises the second, geometrically undefined cutting portion.

18. The saw rope of claim 17, comprising a support rope, two cutting beads and a distance element arranged on the support rope and defining a distance of the two cutting beads.

19. The saw rope of claim 18, wherein the saw rope comprises a sheathing which radially sheaths the distance element and a segment of each of the cutting beads.

20. A saw rope, that in a designated use for sawing a workpiece is moved in a sawing direction, comprising a cutting bead, that in a designated use for sawing a workpiece is moved in a sawing direction, comprising a first, geometrically defined cutting portion, a contour tapering in the sawing direction, said contour beginning at the geometrically defined cutting portion, and a further, second cutting portion, where the further, second cutting portion is a geometrically undefined cutting portion or the further, second cutting portion is a geometrically defined cutting portion, wherein the cutting bead has been screwed onto a thread fixed on a support rope.

21. A method for manufacturing a saw rope, comprising the steps of joining the cutting element and the abrasive element or a cutting element and a neutral element or a cutting element and a base element, and joining the cutting bead onto the support rope, the saw rope, that in a designated use for sawing a workpiece, is moved in a sawing direction, the saw rope comprising a cutting bead, that in a designated use for sawing a workpiece is moved in the sawing direction, comprising a first, geometrically defined cutting portion, a contour tapering in the sawing direction, said contour beginning at the geometrically defined cutting portion, and a further, second cutting portion, where the further, second cutting portion is a geometrically undefined cutting portion or the further, second cutting portion is a geometrically defined cutting portion, the cutting bead comprises a cutting element and an abrasive element formed separately from one another, the cutting element comprises the first, geometrically defined cutting portion and the abrasive element comprises the second, geometrically undefined cutting portion.

22. The method of claim 21, wherein the cutting bead is screwed onto a thread fixed on a support rope.

\* \* \* \* \*